Figure 1:
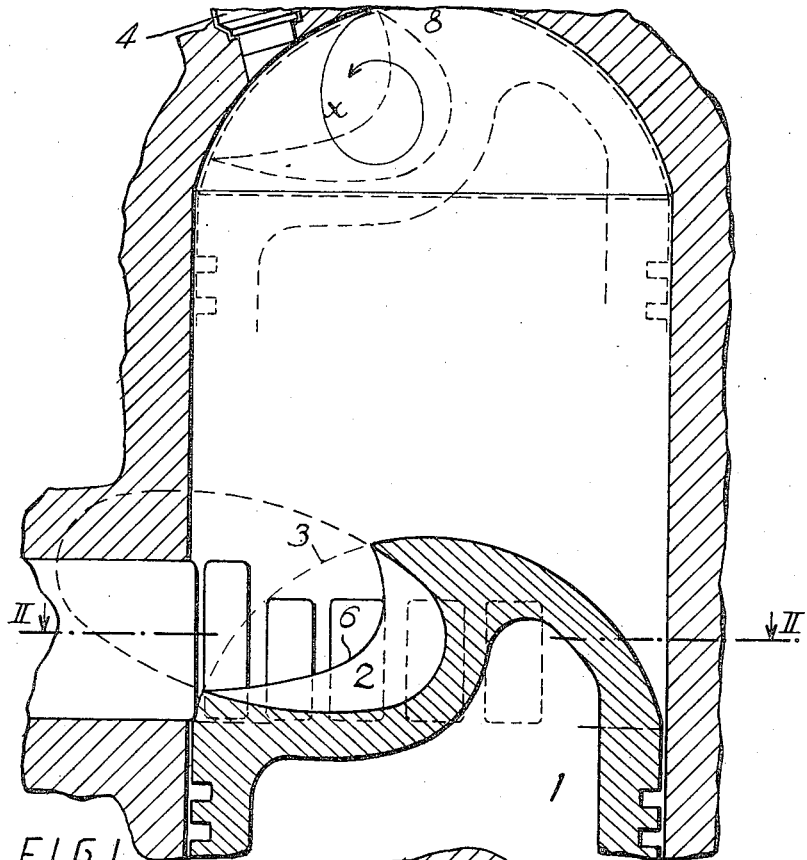

Patented Dec. 4, 1951  2,577,558

UNITED STATES PATENT OFFICE 2,577,558

FORMATION OF THE COMBUSTION SPACE IN PARTICULAR FOR TWO-STROKE ENGINES

Antonin Zelezny, Velesin, Czechoslovakia

Application June 13, 1947, Serial No. 754,528
In Czechoslovakia March 11, 1946

Section 1, Public Law 690, August 8, 1946
Patent expires March 11, 1966

6 Claims. (Cl. 123—65)

In most of previous two-stroke engines, the scavenging takes place at the inlet and outlet ports arranged opposite sides of the cylinder so that the gases in the course of scavenging, flow transversely to the cylinder axis. In order to avoid the danger of mixing and to ensure a thorough scavenging, pistons of the most varied construction, having crowns mainly formed with a blunt nose as flow repeller, have been used. The height of the repeller and thus also its effectiveness are, however, limited by the cylinder head. It has been sought to overcome this by subdividing the piston into two smaller ones between which the partition wall remains standing as a high repeller, and by other complicated suggestions. In addition, such internal combustion engines to which the fuel is mostly supplied through open nozzles into the suction conduit or directly to the flat combustion space above the piston, are in the main, sensitive to the octane value of the fuel used.

These drawbacks are obviated according to the present invention in the main by the improved formation of the combustion space directly in the piston crown. The form of an incomplete ellipsoid is given to this combustion space. This space takes almost the whole air content of the cylinder at the top dead centre position of the piston and the fuel is also injected there.

The cylinder crown is made convex, somewhat in the form of a spherical segment and the aperture of the combustion space is located externally of the apex on the side adjacent to the exhaust ports, at least one opening side coming in the scavenging within the effective range of at least one scavenging port, through which the scavenging current of air enters wholly or partially tangentially into the combustion space.

With such a formation of the combustion space in the convex piston crown, the aperture of this space during the scavenging, comes into such a position with respect to the scavenging ports arranged close to the exhaust ports, that at least part of the scavenging air, therefrom, flows directly and without any inadmissible change of direction into the combustion space, forcing out the remaining combustion gases into the exhaust ports. In this way, there is ensured a complete scavenging of the cylinder without any whirling losses and the so-called core. By the lateral formation of the combustion space, there arises on the convex piston crown a strongly curved sharp nose over which at the close of the compression work, the compressed air flows with great velocity into the combustion space where it effects a powerful whirling action and thus a thorough mixing of the air with the injected fuel.

Since in this way the qeustion of the combustion space with respect to the arrangement of the exhaust and of the scavenging is perfectly solved, it remains to adapt the injection or ignition device to the new formation thereof.

This is attained according to the invention, by the arrangement of the injection nozzle in the cylinder head opposite the projecting nose of the piston end in a position so inclined with respect to the piston or cylinder axis, that the centre point of curvature of the essentially globular form of the combustion space located underneath the piston nose, passes during the fuel injection towards the end of the compression stroke of the piston through the jet of fuel just injected. In consequence of this arrangement, the jet of fuel directed towards the wall of the combustion space along thereof is first deflected, in a direction opposite to the movement of the piston, to the so-called fuel-lacking angle or corner of the combustion space towards the cylinder circumference until, after the passage of the said centre of curvature by the fuel jet, that is, just before the top dead centre position of the piston the deflection of the fuel jet is reversed in the direction of the piston movement, that is, into the so-called fuel-rich summit of the combustion space underneath the nose of the piston. Towards this, at the close of the compression stroke, the whole of the compressed air flows so rapidly out of the cylinder over the sharp piston nose, that, as above-mentioned, it effects therein a powerful whirling and a thorough mixing of the injected fuel with the compressed air.

The emulsion of the injected fuel is not suddenly ignited as in the case of engines in which the working temperature is higher than the flash point of the fuel at the time of the injection, e. g. with diesel engines; but the ignition is propagated gradually as in the case of explosion engines operating with ignition plugs, from the hottest point with a definite velocity. It has now been shown that the hottest point of the combustion space in question is formed by the apex of the piston nose, from which the heat cannot be dissipated sufficiently rapidly and which is only cooled by the heat of evaporation of the fuel. Directly above this nose, therefore, the ignition plug can be placed in the apex of the cylinder head.

With such an arrangement and formation of the combustion space, the compression ratio of the engines even when using fuels of normal octane value, can be so raised, that improvement attained by this increase in the thermo-dynamic efficiency of the combustion, is expressed by a noticeable saving in fuel, without there taking place premature knocking with its undesired results.

Several examples of execution of the construction according to the invention are shown on the drawing. Fig. 1 is an axial section through the cylinder with the piston in its two limiting positions, Fig. 2 is a cross-section on the line 11—11 of Fig. 1, and Fig. 3 is another axial section through the cylinder, cylinder head and the piston close to its top dead centre position before the completion of the compression stroke.

Figure 2:
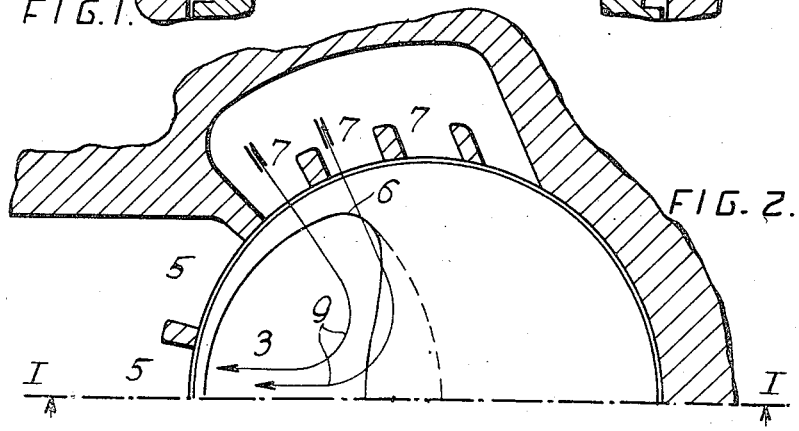
Figure 3:
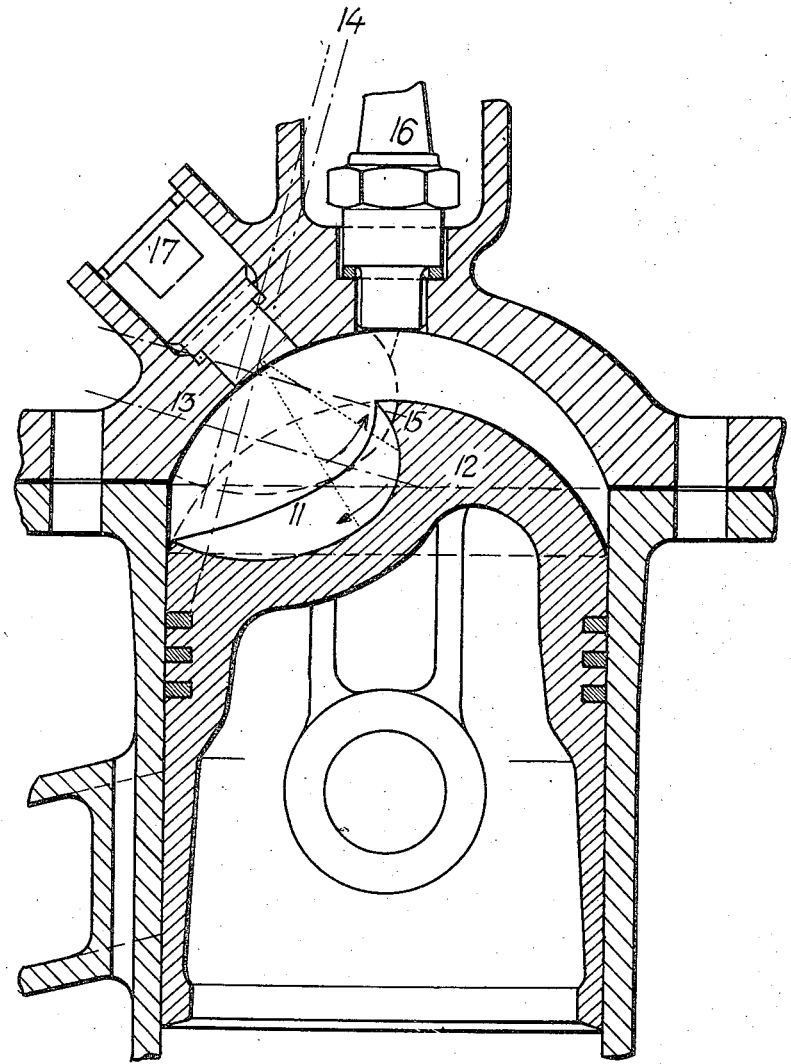

In the embodiment according to Figs. 1 and 2, the piston 1 has a convex crown in the form of a spherical section in which laterally of its apex the combustion space 2 is recessed in the form of an incomplete ellipsoid. This space takes up in the top dead centre position of the piston almost the whole of the compressed air from the cylinder with which it is in communication by the aperture 3. By this aperture it will also take the fuel from the injection nozzle 4 at the close of the compression stroke. The aperture 3 is directed towards the ports 5 of the scavenging conduit, it lies externally of the apex of the end of the piston and is so formed that its two side edges 6 on the scavenging come within the working range of the scavenging ports 7 which are arranged close to the exhaust ports 5. The result is thereby attained that the scavenging air flows wholly or for the most part tangentially into the scavenging space, as indicated by arrows 9. The currents of scavenging air penetrating into this space from both sides rise mutually in the symmetrical plane of the piston and after forcing out the remainder of the combustion gases into the exhaust ports, they fill up the entire combustion space.

It will be understood that a transverse scavenging can also be used for a combustion space so arranged, if its aperture engages with the one side in the working range of the scavenging ports and opens by the other side in the ports of the exhaust conduit. The scavenging air then flows through the combustion space transversely to the axis of the cylinder.

The combustion space may have the shape of any suitable rotation body such as a sphere, an ellipsoid, an ovoid or the like, the axis of which is preferably inclined to the axis of the cylinder. By such a recessing, there arises in the apex of the end of the cylinder a sharp nose 8, below which at the close of the compression stroke, the compressed air is set in pronounced whirling or turbulence as indicated by the arrow X and is thoroughly mixed with the injected fuel.

In the embodiment according to Fig. 3, the ellipsoidally shaped combustion space 11 is again recessed laterally of the apex of the piston crown 12 of spherical section shape, to which also the form of the cylinder head 13 is adapted. The active upper surface of the combustion space is formed mainly from the piston wall and only partially from the inner wall of the cylinder head 13. Into this space formed by a part of the rotation ellipsoid in the piston end, which is conically enlarged outwardly in the direction of its rotation axis 14 somewhat inclined to the axis of the piston and closed by the inner wall of the cylinder head, is forced in the top dead centre position of the piston shown in broken lines, almost the whole of the combustion air of the cylinder. By means of this recessing, there arises in the apex of the piston crown 12 a sharp nose 15 above which the ignition plug 16 is screwed into the apex of the cylinder head 13. The injection nozzle 17 which is directed in the apex of the combustion space 11 is fitted inclined with respect to the projecting nose 15 in the apex of the cylinder head 13.

In the position shown in full lines on the drawing of the piston 12, the centre of curvature of the apex of the combustion space 11 just touches the lower edge of the current of fuel up to then deflected downward in the direction of the arrow to the circumference of the cylinder. In the position of the piston shown in broken lines the passage of the centre of curvature through the current of fuel is already completed and consequently this current is repelled in the other arrow direction upwards to the apex of the combustion space. In this way the piston movement during the fuel injection is utilised advantageously for the complete distribution of the fuel and its thorough mixing with the air.

I claim:

1. In an internal combustion engine, in combination, a cylinder having a bore and a concave end wall in the form of a spherical section, a piston slidable in said bore and having a convex head in the form of a spherical section of substantially the same contour as said cylinder end wall and adapted to closely approach said end wall at one end of its stroke, said piston having formed in its head laterally of its center point a recess in the form of an incomplete ellipsoid whose main axis is arranged to intersect the center axis of the piston at an angle, said recess when covered in the upper dead center position of the piston by a portion of the concave end wall of said cylinder forming a closed chamber containing almost the entire air content of the cylinder, and means for injecting the fuel into said chamber.

2. In an internal combustion engine, in combination, a cylinder having a bore and a concave end wall in the form of a spherical section, a piston slidable in said bore and having a convex head in the form of a spherical section of substantially the same contour as said cylinder end wall and adapted to closely approach said end wall at one end of its stroke, said piston having formed in its head laterally of its center point a recess in the form of an incomplete ellipsoid whose main axis is arranged to intersect the center axis of the piston at an angle, said piston controlling exhaust ports and scavenging ports arranged in the lower portion of said cylinder which ports are arranged to be brought into communication with each other by said recess in the head of the piston when the latter reaches its lower dead center position, said recess when covered in the upper dead center position of the piston by a portion of the concave end wall of said cylinder forming a closed chamber containing almost the entire air content of the cylinder, and means for injecting the fuel into said chamber.

3. In an internal combustion engine, in combination, a cylinder having a bore and a concave end wall in the form of a spherical section, a piston slidable in said bore and having a convex head in the form of a spherical section of substantially the same contour as said cylinder end wall and adapted to closely approach said end wall at one end of its stroke, said piston having formed in its head laterally of its center point a recess in the form of an incomplete ellipsoid whose main axis is arranged to intersect the center axis of the piston at an angle, said piston controlling exhaust ports and scavenging ports arranged in the lower portion of said cylinder which ports are arranged to be brought into communication with each other by said recess in the head of the piston when the latter reaches its lower dead center position, the scavenging ports being arranged in such a manner that the scavenging air enters said ellipsoidal recess tangentially to its wall to be deflected outwardly along the long axis of the same and into the exhaust ports, said recess when covered in the upper dead center position of the piston by a portion of the concave end wall of said cylinder forming a closed chamber containing almost the entire air content of the cylinder, and means for injecting the fuel into said chamber.

4. In an internal combustion engine, in combination, a cylinder having a bore and a concave end wall in the form of a spherical section, a piston slidable in said bore and having a convex head in the form of a spherical section of substantially the same contour as said cylinder end wall and adapted to closely approach said end wall at one end of its stroke, said piston having formed in its head laterally of its center point a recess in the form of an incomplete ellipsoid whose main axis is arranged to intersect the center axis of the piston at an angle so that there is formed at the uppermost portion of the piston head a laterally extending nose overlying the bottom of said recess, said recess when covered in the upper dead center position of the piston by a portion of the concave end wall of said cylinder forming a closed chamber containing almost the entire air content of the cylinder, and means for injecting the fuel into said chamber.

5. In an internal combustion engine, in combination, a cylinder having a bore and a concave end wall in the form of a spherical section, a piston slidable in said bore and having a convex head of substantially the same contour as said cylinder end wall and adapted to closely approach said end wall at one end of its stroke, said piston having formed in its head laterally of its center point a recess in the form of an incomplete ellipsoid whose main axis is arranged to intersect the center axis of the piston at an angle so that there is formed at the uppermost portion of the piston head a laterally extending nose overlying the bottom of said recess, said recess when covered in the upper dead center position of the piston by a portion of the concave end wall of said cylinder forming a chamber containing almost the entire air content of the cylinder, and a fuel injection nozzle mounted in the cylinder head at an inclination with respect to laterally extending nose formed by said ellipsoidal recess in the piston head so as to direct the fuel into the apex of said recess.

6. In an internal combustion engine, in combination, a cylinder having a bore and a concave end wall in the form of a spherical section, a piston slidable in said bore and having a convex head of substantially the same contour as said cylinder end wall and adapted to closely approach said end wall at one end of its stroke, said piston having formed in its head laterally of its center point a recess in the form of an incomplete ellipsoid whose main axis is arranged to intersect the center axis of the piston at an angle so that there is formed at the uppermost portion of the piston head a laterally extending nose overlying the bottom of said recess, said recess when covered in the upper dead center position of the piston by a portion of the concave end wall of said cylinder forming a chamber containing almost the entire air content of the cylinder, and an ignition plug arranged at the center point of the cylinder head above said laterally extending nose formed by said ellipsoidal recess in the piston head.

ANTONIN ZELEZNY.

REFERENCES CITED

The following references are of record in the file of this patent:

UNITED STATES PATENTS

| Number | Name | Date |
| --- | --- | --- |
| 1,808,384 | Tanneyhill | June 2, 1931 |
| 1,833,861 | Sass et al. | Nov. 24, 1931 |
| 1,943,495 | Thomas | Jan. 16, 1934 |
| 2,265,677 | Straub | Dec. 9, 1941 |

FOREIGN PATENTS

| Number | Country | Date |
| --- | --- | --- |
| 155,034 | Great Britain | of 1920 |
| 111,397 | Austria | of 1928 |
| 651,632 | Germany | of 1937 |
| 900,686 | France | of 1944 |